Patented Nov. 20, 1934

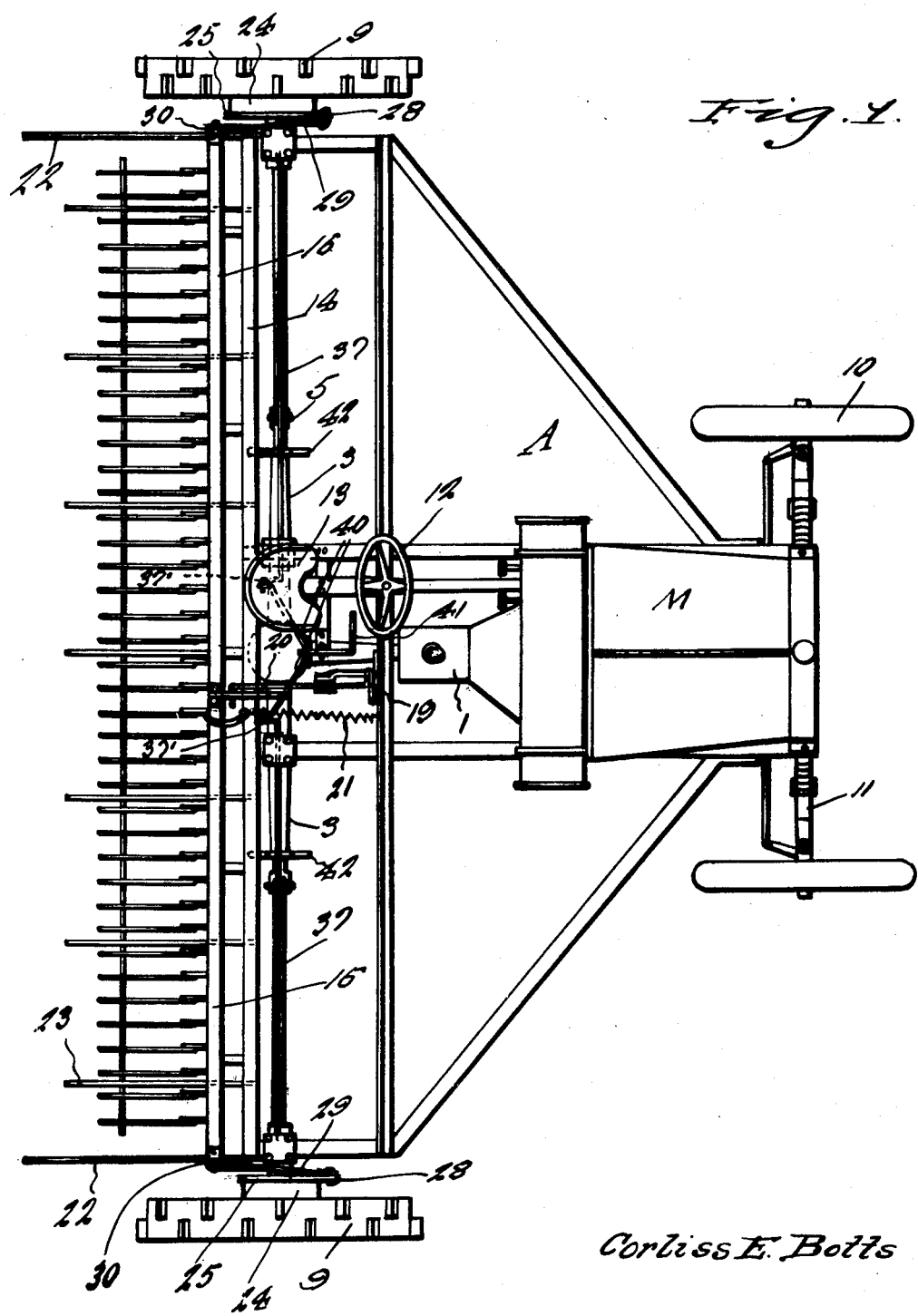

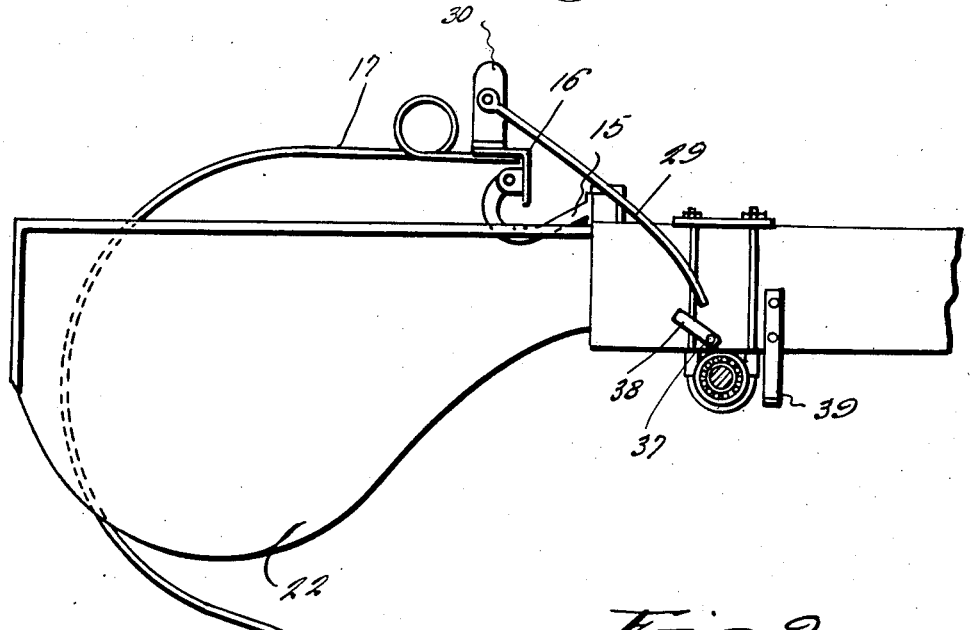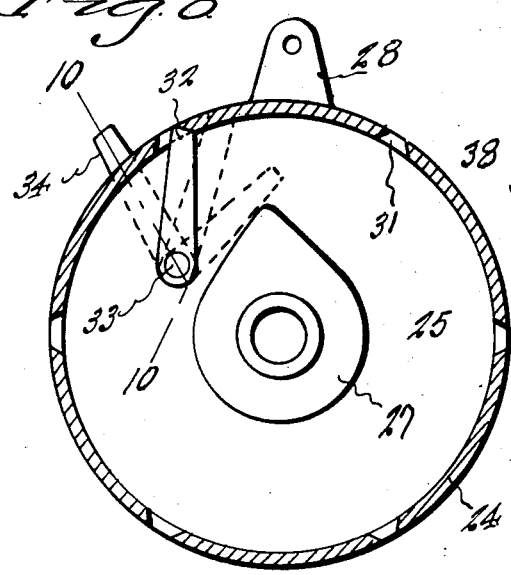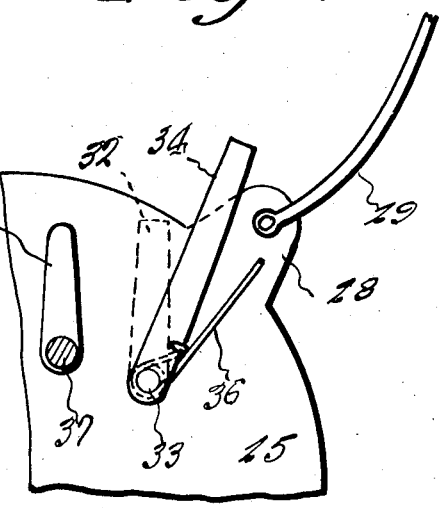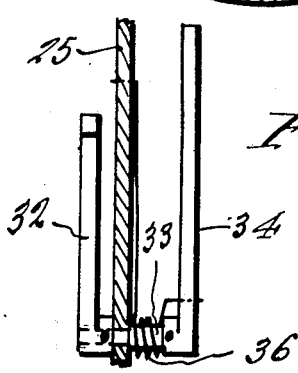

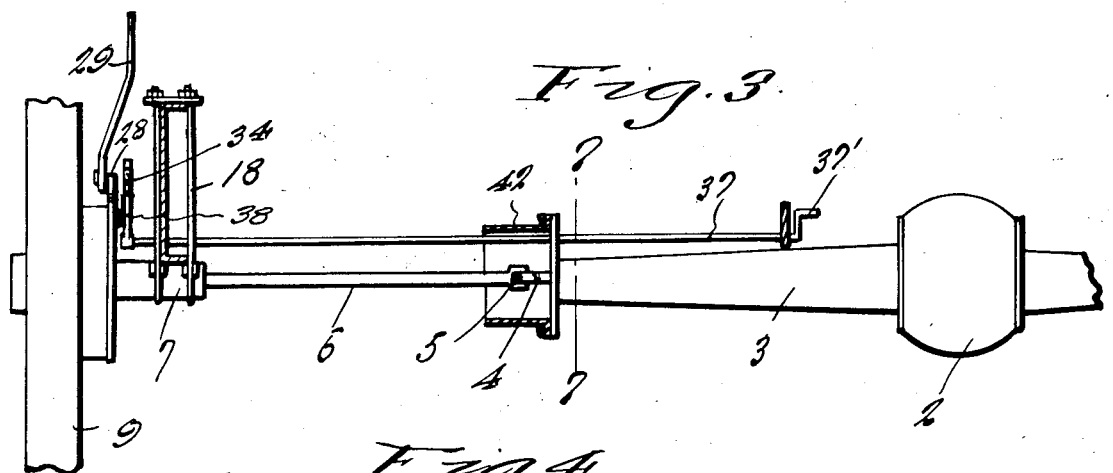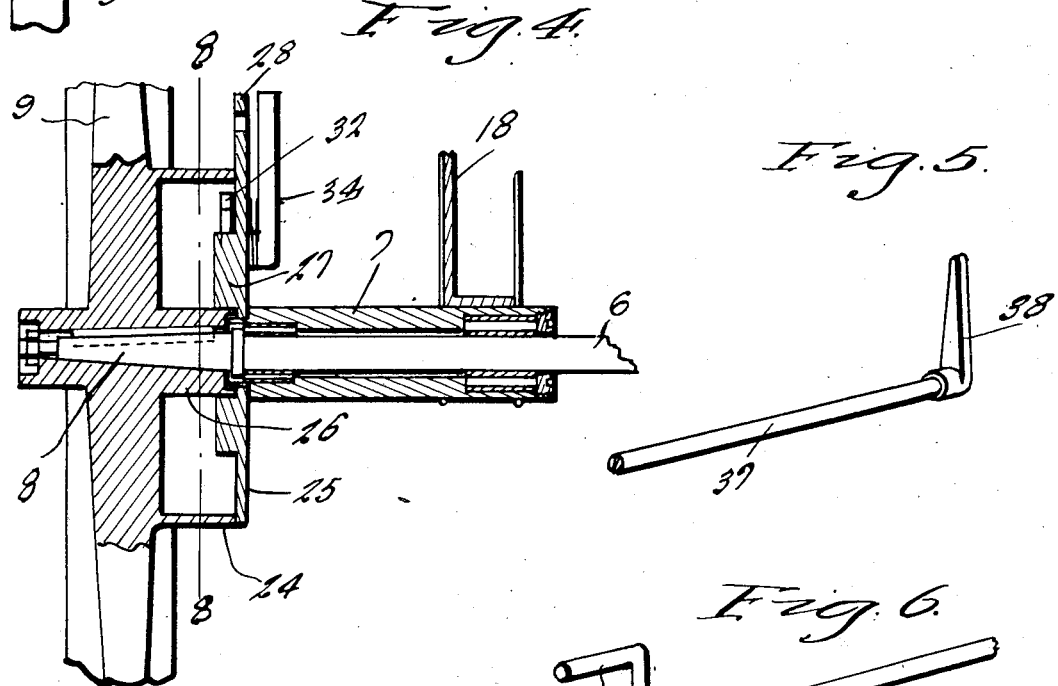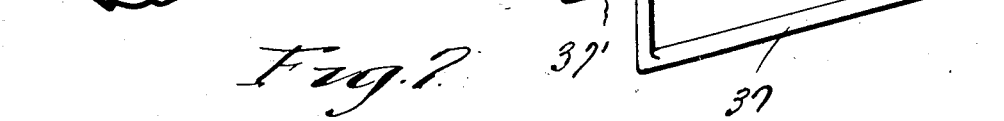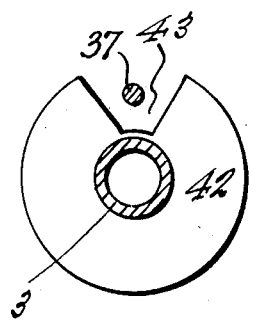

1,981,303

UNITED STATES PATENT OFFICE 1,981,303

MOTOR HAY RAKE

Corliss E. Botts, Cascade, Nebr., assignor of one-half to Clarence Clark, Elsmere, Nebr.

Application August 8, 1933, Serial No. 684,274

5 Claims. (Cl. 56—27)

This invention relates to a motor driven hay rake, the general object of the invention being to provide a frame supported by front and rear wheels and having a motor thereon which drives the rear wheels through differential means, with a rake attached to the rear part of the frame and to provide means controlled by the operator, whereby the rake can be dumped through means actuated by the rear wheels.

Another object of the invention is to so connect the wheels with the motor that the apparatus can make turns with the inner drive wheel almost stationary, so that it can be turned in small places such as fence corners.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a plan view of the invention.

Fig. 2 is a fragmentary rear view of one side thereof with parts in section.

Fig. 3 is a view partly in section showing the means for connecting one of the wheels to a shaft of the differential means.

Fig. 4 is a sectional view showing the bearing means for the outer end of the extension shaft and showing how the wheel parts are arranged.

Fig. 5 is a view of the outer end of a shaft forming part of the dumping means.

Fig. 6 is a view of the inner end of said shaft.

Fig. 7 is a section on line 7—7 of Fig. 3.

Fig. 8 is a section on line 8—8 of Fig. 4.

Fig. 9 is a fragmentary view showing some of the dumping means.

Fig. 10 is a section on line 10—10, Fig. 8.

In these drawings, the letter A indicates a frame which supports the motor M which includes the transmission means 1 which is connected in the usual manner to a differential located in a housing 2. The shaft housings of the differential are shown at 3, and one of the shafts is shown at 4 in Fig. 3. The outer end of each shaft 4 is connected by a universal joint 5 with an extension shaft 6, the outer part of which extends through an elongated bearing member 7, and each shaft terminates in a spindle 8 to which the drive wheel 9 is connected.

The front wheels are shown at 10 and are carried by the usual front axle 11 and these front wheels are provided with the usual steering means which are operated from the steering wheel 12 located adjacent the seat 13 on the frame.

As shown, the frame is formed with an elongated rectangular rear part, the rear bar 14 of which carries the substantially hook-shaped rear extending members 15 to which the rake bar 16 is hinged, this rake bar carrying the rake teeth 17. The ends of the rectangular portion of the frame support the bearing members 7 as shown generally at 18.

The rake is raised and lowered in the usual manner, by the foot pedal 19 and the hand lever 20 which are assisted by the spring 21, these parts being well known for any desired construction.

A rearwardly extending shield 22 is fastened to each end of the rear part of the frame and extends beyond the ends of the rake as shown in Figs. 1 and 2 and the usual rearwardly extending stripper bars 23 are connected with the rear bar 14 of the frame and pass between portions of pairs of the teeth to cause the hay to leave the teeth, as the teeth are raised.

A casing 24 extends inwardly from the central part of each wheel, and the inner end of said casing is closed by a plate 25 which is rotatably supported between the outer end of the member 7 and the hub extensions 26 of the wheel. This plate has a cam-shaped enlargement 27 on its inner face, and it is formed with an ear 28 which has a hole therein to which is pivoted one end of a bar 29, the other end of the bar being pivoted to an upright 30 at each end of the rake bar 16. The side wall of this casing 24 has outwardly tapering holes 31 therein, any one of which is adapted to be engaged by the free end of an arm 32 fastened to the inner end of the stub shaft 33 which is journaled in the plate 25. A longer arm 34 is fastened to the outer end of the stub shaft and the spring 36 tends to hold the two arms and the stub shaft in the dotted line position shown in Fig. 8, with the short arm 32 resting against the enlargement 27.

A pair of shafts 37 is journaled in the frame A and the outer end of each shaft carries an arm 38 which is adapted to engage the arm 34 on the stub shaft 33. When the shaft 37 is rocked, arm 38 will move the stub shaft and the arms 32 and 34, to a position where the arm 32 will engage the inner wall of the casing 24. When this occurs, the rotary movement of the wheel and the casing will cause one of the openings 31 to engage the end of the short arm 32 so that the plate 25 will be caused to rotate with the wheel, and this movement of the plate will exert a pull upon the rod 29 which will be communicated to the upright 30, and thus the rake will be raised.

Each plate will continue to move with its wheel until the arm 34 strikes a bracket 39 on each end of the frame and when this occurs, the arm moves backward to its original position, which will free the arm 32 from the hole in the casing, and thus the plate will be disconnected from the wheel and the rake will drop to raking position under the action of gravity.

The inner ends of the two shafts 37 have cranks as shown at 37' and these crank ends are connected by a bent link 40 to a foot lever 41 located adjacent seat 13 so that when the operator wishes to cause the wheels to dump the rake, it is simply necessary to press upon this foot lever 41 to rock the shafts 37, so that the arms 38 will move the arms 32 and 34 to the position where the arms 32 will be engaged by some of the holes 31 of the casing 24 which will drive the plates 25 from the wheels and thus cause the wheels to dump the rake.

A shield 42 is attached to the outer end of each housing 3 and covers the universal joint 5, and each shield is notched as at 43, Fig. 7, so that the shaft 37 can pass through the same. The rear wheels 9 are preferably formed as shown in the drawings, so that they will secure good traction even in soft ground.

From the foregoing it will be seen that I have provided a motor driven rake which can be run in low speed on rough and uneven ground, and intermediate speed for level ground. High speed is used for road travel. The load can be dumped whenever desired by the wheels, and this dumping action is controlled by the operator and he can also dump the rake by either the hand lever or the foot pedal in the usual manner. By attaching the wheels to the shafts of the differential mechanism as shown, the device can make short turns, so that the rake can be brought close to corners and the like.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. A motor driven rake comprising a frame, front and rear wheels carried by the frame, a power plant on the frame, a differential connected with the power plant, extension shafts connected by universal joints to the outer ends of the differential shafts, means for connecting the rear wheels to the outer end of said extension shafts, and a dump rake attached to the rear part of the frame.

2. A motor driven rake comprising a frame, front and rear wheels carried by the frame, a power plant on the frame, a differential connected with the power plant, extension shafts connected by universal joints to the outer ends of the differential shafts, means for connecting the rear wheels to the outer ends of the extension shafts, a dump rake attached to the rear part of the frame, and manually controlled means for dumping the rake by movement of a rear wheel.

3. A motor driven rake comprising a frame, front and rear wheels carried by the frame, a power plant on the frame, a differential connected with the power plant, extension shafts connected by universal joints to the outer ends of the differential shafts, means for connecting the rear wheels to the outer end of the extension shafts, a dump rake attached to the rear part of the frame, manually controlled means for dumping the rake by movement of the rear wheels, said means comprising a plate rotatably supported adjacent each wheel, means for connecting the plate with the rake, a casing attached to each wheel and having apertures therein, a stub shaft carried by each plate, an arm on the inner end of each stub shaft, an arm on the outer end of each stub shaft, a pair of rock shafts supported by the frame, each having an arm at its outer end for engaging the outer arm of a stub shaft for rocking the stub shaft to place the inner arm in engagement with one of the apertures, and manually operating means for rocking said rock shafts.

4. An apparatus of the class described comprising a frame, a steering wheel at the front end thereof, a power plant supported on the frame, a differential mechanism connected with the power plant, extension shafts connected by universal joints to the outer ends of the differential shafts, bearing means carried by the frame for the outer ends of the extension shafts, a rear wheel connected to the outer end of each extension shaft, a dumping rake connected to the rear part of the frame, manually controlled means for dumping the rake from the movement of the rear wheels, and manually operating means for dumping the rake and for holding it in raised position when desired.

5. A motor driven rake comprising a frame, a power plant thereon, a differential supported by the frame and driven from the power plant, front and rear wheels supporting the frame, means for connecting the rear wheels to the shafts of the differential, a dump rake attached to the rear part of the frame, a rotary member carried by the frame adjacent a rear wheel, means for connecting said member to the rake, whereby rotary movement of said member will raise the rake, said means comprising a casing attached to said rear wheel and having apertures therein, a stub shaft carried by said rotary member, an arm on one end of the stub shaft for engaging an aperture when the arm has been moved to a certain position to lock the rotary member to the wheel, a second arm on the stub shaft, a rock shaft supported by the frame, and manually operated, an arm on the rock shaft for engaging the second arm for imparting movement to the stub shaft to move the first arm into engagement with an aperture, and a projection on the frame for engaging the second arm, when the rotary member has been rotated to a certain position, for releasing the first arm from the aperture with which it engages.

CORLISS E. BOTTS.